United States Patent [19]

Nagaoka et al.

[11] 4,375,610
[45] Mar. 1, 1983

[54] WINDSHIELD WIPER DEVICE FOR AUTOMOBILES

[75] Inventors: Mituru Nagaoka; Sizuo Sumida, both of Hiroshima, Japan

[73] Assignee: Toyo Kogyo Co., Ltd., Hiroshima, Japan

[21] Appl. No.: 194,919

[22] Filed: Oct. 7, 1980

[30] Foreign Application Priority Data

Oct. 8, 1979 [JP] Japan ................ 54-130668

[51] Int. Cl.³ ............................. H02P 3/08
[52] U.S. Cl. ................... 318/444; 318/281; 318/DIG. 2; 307/10 R; 15/250.12
[58] Field of Search ............. 318/443, 444, DIG. 2, 318/484, 281; 307/9, 10 R; 15/250.12, 250.13

[56] References Cited

U.S. PATENT DOCUMENTS

| 3,783,362 | 1/1974 | Basso et al. | 318/443 |
| 3,796,936 | 3/1974 | Kearns | 318/443 |
| 3,800,163 | 3/1974 | Scheer | 318/443 X |
| 4,037,146 | 7/1977 | Kondo | 318/444 |
| 4,091,317 | 5/1978 | Roszyk et al. | 318/DIG. 2 X |
| 4,158,159 | 6/1979 | Orris et al. | 318/443 |
| 4,286,200 | 8/1981 | Brown | 318/443 |

FOREIGN PATENT DOCUMENTS

| 2403311 | 7/1975 | Fed. Rep. of Germany | 15/250.12 |
| 2621116 | 11/1977 | Fed. Rep. of Germany | 318/443 |
| 2649413 | 5/1978 | Fed. Rep. of Germany | 318/443 |
| 2718177 | 11/1978 | Fed. Rep. of Germany | 15/250.12 |
| 2826347 | 1/1980 | Fed. Rep. of Germany | 318/443 |
| 2911554 | 9/1980 | Fed. Rep. of Germany | 15/250.12 |

Primary Examiner—J. V. Truhe
Assistant Examiner—Richard M. Moose
Attorney, Agent, or Firm—Fleit & Jacobson

[57] ABSTRACT

A windshield wiper device for automobiles including a control circuit for controlling a wiper drive motor. The control circuit has a wiper switch including an intermittent position wherein the wiper is intermittently driven. In the intermittent position of the wiper switch, the wiper is at first driven for one complete stroke. Then, after a desired time, the operator actuates a time interval setting switch whereby the wiper is thereafter driven intermittently with the desired time interval.

4 Claims, 7 Drawing Figures

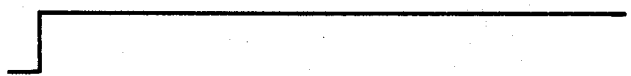
FIG. 2a  A
FIG. 2b  CP
FIG. 2c  D₁
FIG. 2d  Q̄₁
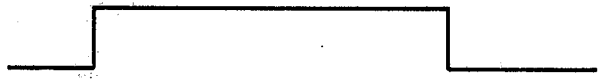
FIG. 2e  Q₂
FIG. 2f  Q̄₂

WINDSHIELD WIPER DEVICE FOR AUTOMOBILES

BACKGROUND OF INVENTION

1. Field of Invention

The present invention relates to a windshield wiper device for automobiles and more particularly to an intermittent driving device for automobile windshield wipers.

2. Description of Prior Art

Conventionally, a windshield wiper device for automobiles has been of such a type in which wiper blades are continuously driven even under a sprinkling or fine rain. Thus, in the conventional wiper devices, the wiper blades are rapidly worn and there is an energy loss for continuously driving the wiper blades. In order to solve the above problem, it has been proposed and already put into practice to drive the wiper blades with a certain rest time between each two driving strokes so that the wiper blades are moved intermittently. However, even with the intermittent drive, it has not been possible to determine a rest time which is suitable for a wide range of raining conditions. In fact, the wiper blades may be moved too quickly for the amount of rain in some instances but may be too slow in other instances.

SUMMARY OF INVENTION

It is therefore an object of the present invention to provide a windshield wiper device for automobiles in which intervals of wiper blade driving strokes can be controlled as desired.

Another object of the present invention is to provide a control device for a windshield wiper in which the wiper blade is intermittently driven with intervals corresponding to a period between a first stroke of the wiper blade movement and a switch actuation which is made by the driver in accordance with the rain condition.

According to the present invention, the above and other objects can be accomplished by a windshield wiper device for an automobile comprising wiper blade means adapted for wiping engagement with a windshield, blade driving motor means, control circuit means for the blade driving motor means including time interval setting switch means, memory means memorizing a time interval which is determined by the setting switch means, pulse generating means for producing pulse signals having time intervals which are equal to the time interval memorized in the memory means, and means for energizing the motor means in accordance with the pulse signals. In one mode of the present invention, the motor means is provided with energizing circuit means which includes control switch means having an intermittent position. When the switch means is moved to the intermittent position, the motor means is energized to drive the blade means for one reciprocating stroke. After a desired time interval, the driver may actuate the time interval setting switch means whereby the motor means is energized again to drive the blade means for another reciprocating stroke. The time interval between the first and second strokes of the wiper blade means is memorized and utilized for further intermittent energizations of the motor means. Thus, it is possible to drive the wiper blade means intermittently with time intervals which is the most appropriate for actual rain conditions.

BRIEF DESCRIPTION OF DRAWINGS

The above and other objects and features of the present invention will become from the following descriptions of a preferred embodiment taking reference to the accompanying drawings, in which.

DETAILED DESCRIPTION

Figure 1:
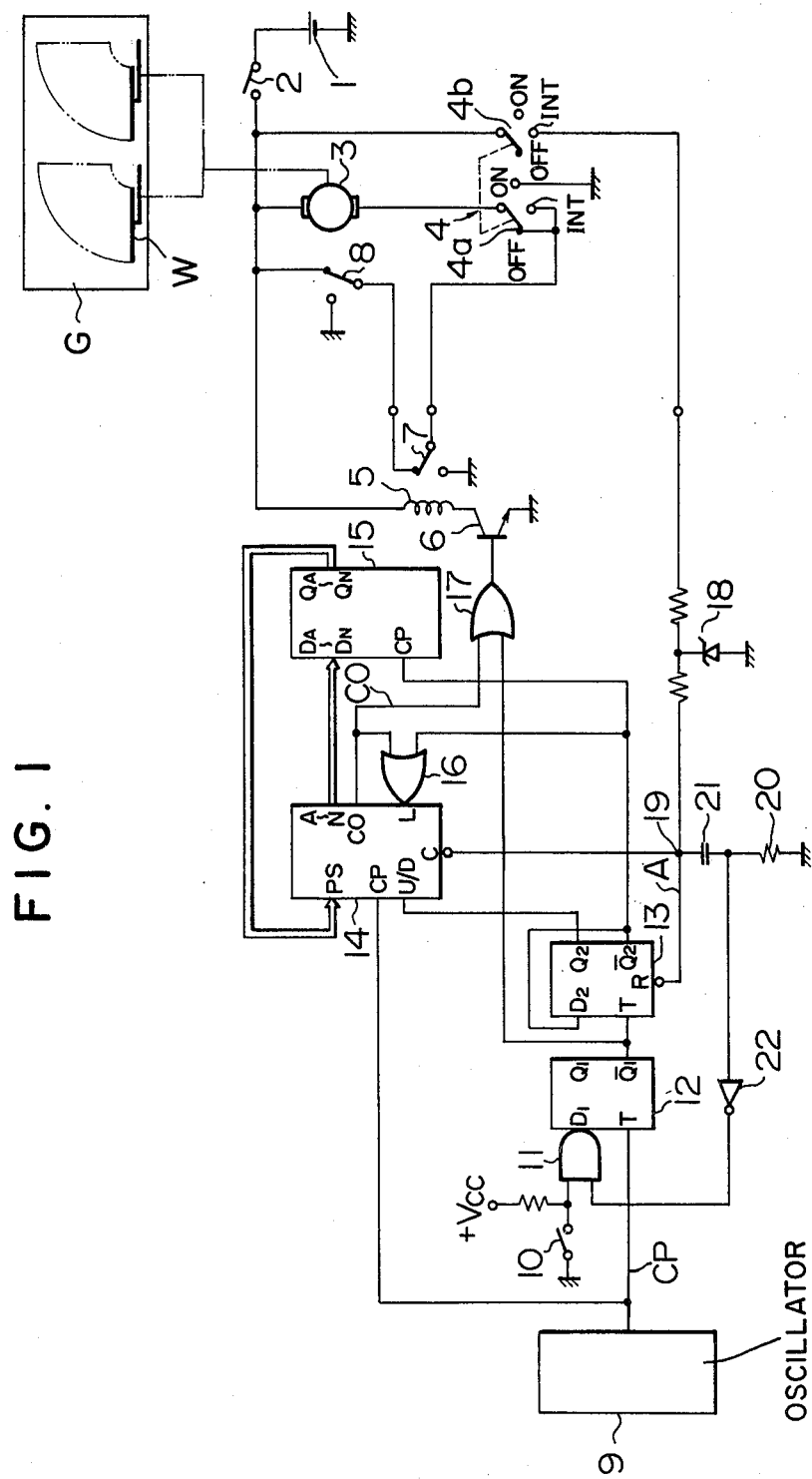
FIG. 1 is a diagram showing a windshield wiper control circuit in accordance with one embodiment of the present invention; and, FIGS. 2(a)-(f) is a diagram showing signals in various parts of the circuit shown in FIG. 1.

Referring to the drawings, particularly to FIG. 1, there is diagrammatically shown a windshield glass G of an automobile having a pair of wiper blades W. The control circuit for the wiper blades W includes a driving motor 3 connected with a power source 1 through a main switch 2. For controlling the motor 3, there is provided a wiper switch 4 which has ON, OFF and INT positions. The switch 4 includes a first arm 4a which is connected with the motor 3 and adapted to be brought into engagement alternately with three stationary contacts. In the ON position of the switch 4, the motor energizing circuit is completed through the arm 4a so that the motor 3 is continuously energized. In the OFF and INT positions of the switch 4, the line from the motor 3 is connected with a contact arm 7 of a relay 5 so that the motor energizing circuit is completed through the switch arms 4a and 7 when the relay 5 is energized. In the de-energized position of the relay 5, the line from the motor 3 is connected with an auto-stop switch 8 which grounds the line when the wiper blades W are out of the nest positions which are shown by solid lines in FIG. 1. Thus, when the wiper switch 4 is in the OFF or INT position and the relay 5 is de-energized, the motor energizing circuit is completed as long as the wiper blades W are out of the nest position.

The control circuit has an oscillator 9 which has an output connected with a first D-type flip-flop 12 at the T-input thereof. The output of the oscillator 9 is also applied to a counter 14 at the CP-input thereof. The first flip-flop 12 has a D-input $D_1$ which is connected with an output of an AND gate 11. The AND gate 11 has an input which is connected with a power source Vcc through a suitable resistor and also grounded through a normally open switch 10.

In the control circuit, there is also provided a second D-type flip-flop 13 having a T-input connected with the $\overline{Q_1}$ output of the first flip-flop 12. The flip-flop 13 further has a $D_2$-input which is connected with a $\overline{Q_2}$ output thereof. The $Q_2$ output of the flip-flop 13 is connected with the U/D terminal of the counter 14 so that the upcount and downcount of the counter 14 is controlled in accordance with the $Q_2$ output.

The wiper switch 4 has a second arm 4b which is interconnected with the first arm 4a and adapted engage alternately with three stationary contacts OFF, INT and ON. The INT contact for the arm 4b is connected through a buffer circuit 18 with a terminal 19 which is in turn connected with the reset terminal R of the second flip-flop 13 and the clear terminal C of the counter 14. The terminal 19 is also connected with a differentiation circuit including a resistor 20 and a capacitor 21. The differentiation circuit is connected through an inverter 22 with the AND gate 11.

The counter 14 has a load terminal L which is connected with the output of an OR gate 16 having an input connected with the $\overline{Q_2}$ output of the second flip-flop 13 and a second input connected with a carry output CO of the counter 14. The counter 14 further has count outputs A to N which are connected with data inputs $D_A$ to $D_N$ of a latch 15 which in turn has outputs $Q_A$ To $Q_N$ connected with a preset terminal PS of the counter 14. The latch 15 has a CP input which is connected with the $\overline{Q_2}$ output of the second flip-flop 13.

The CO output of the counter 14 and the $\overline{Q_1}$ output of the first flip-flop 12 are connected with an OR gate 17 which has an output connected with the base of a transistor 6. The transistor 6 is connected with the relay 5 at the collector thereof, the emitter of the transistor 6 being grounded.

In operation, when the wiper switch 4 is moved from the OFF position to the INT position, the voltage at the terminal 19 is increased as shown by A in FIG. 2 (a). The voltage is applied to the reset terminal R of the second flip-flop 13 to reset the same and also to the clear terminal C of the counter 14 to clear the count. The voltage is also applied to the differentiation circuit comprised of the resistor 20 and the capacitor 21 and the output of the differentiating circuit is applied through the inverter 22 to the AND gate 11. The AND gate 11 therefore produces an output as shown by $D_1$ in FIG. 2 (c) which is applied to the $D_1$ input of the first flip-flop 12.

The oscillator 9 produces clock pulses as shown by CP in FIG. 2 (b) and the clock pulse CP are applied to the T-input of the flip-flop 12. When there is zero input at the $D_1$ input of the flip-flop 12, there is produced at the $\overline{Q_1}$ output a signal which increases in response to an increase in the clock pulse CP as shown by $\overline{Q_1}$ in FIG. 2 (d). As the $\overline{Q_1}$ output is thus turned to level "1", it turns the transistor 6 on through the OR gate 17 so as to energize the relay 5. Thus, the motor energizing circuit is completed through the switch arms 4a and 7. The motor 3 is therefore energized to drive the wiper blades W. Before the wiper blades W complete their one reciprocating stroke, the $\overline{Q_1}$ output is turned to "0" level so that the transistor 6 is turned off to de-energize the relay 5. The operation of the motor 3 is however continued because a grounding circuit is established through the auto-stop switch 8 until the wiper blades W return to the nest positions.

Thereafter, the operation of the motor 3 is interrupted and, when a certain amount of rain droplets are deposited on the windshield, the driver may feel it necessary to drive the wiper again. Then, he momentarily actuates the time interval setting switch 10. The $D_1$ input of the flip-flop 12 is again turned to "0" level so that the $\overline{Q_1}$ output is turned to "1" level in response to a succeeding clock pulse CP. The $\overline{Q_1}$ output then functions to turn the $\overline{Q_2}$ output of the second flip-flop 13 to "0" and an inverted wave is produced at the $\overline{Q_2}$ output of the flip-flop 13 as shown in FIGS. 2 (e) and (f). As long as the $Q_2$ output is in the "1" level, the counter 14 is in the upcount position so that an upcount of the clock pulses is carried out until the $Q_2$ output is turned to "0" level. The count outputs A to N are applied to the data inputs DA to DN of the latch 15. As soon as the $Q_2$ output is turned to "0" level to terminate the counting by the actuation of the switch 10, the $\overline{Q_2}$ output is turned to "1" level so that a high level signal is applied to the load terminal L to turn the counter 14 to a load condition. Thus, the final count as stored in the latch 15 is applied to the preset terminal PS.

As soon as the $Q_2$ output of the second flip-flop 13 is turned to "0" level, the counter 14 is turned to a down-count condition so that the clock pulses CP from the oscillator 9 are subtracted from the preset value in the counter 14. When the count becomes zero as the result of the subtraction, there is produced a carry signal CO which is applied to the OR gate 17 to turn the transistor 6 on. Thus, the relay 5 is energized again to operate the motor 3. Therefore, a second stroke of wiper operation is carried out. The carry signal CO is also applied to the load terminal L of the counter 14 so as to turn it to the load condition. Thus, the memory in the latch 15 is again applied to the preset terminal PS of the counter 14 and the same operation is repeated to intermittently drive the wiper blades with the same time intervals. It can of course be easily accomplished to change the time intervals whenever desired.

The invention has thus been shown and described with reference to a specific embodiment, however, it should be noted that the invention is in no way limited to the details of the illustrated arrangement but changes and modifications may be made without departing from the scope of the appended claims. For example, in the illustrated embodiment, the starting pulse is produced by the actuation of the wiper switch to the INT position, however, the arrangement may be such that the starting pulse be produced also by the time interval setting switch.

We claim:

1. A windshield wiper device for an automobile comprising wiper blade means adapted for wiping engagement with a windshield, blade driving motor means for driving the wiper blade means, control circuit means for controlling the blade driving motor means and including a wiper switch for producing a first signal, a time interval setting switch for producing a second signal, an up-down counter which is able to count in two different directions, said up-down counter starting a count in a first one of said two different directions from a reference value upon receipt of said first signal and for stopping the count upon receipt of the second signal, a memory responsive to the second signal for memorizing the counted value in the up-down counter when the second signal is produced, said up-down counter receiving the counted value memorized in the memory as a set input and repeatedly counting in a second one of said two different directions from the counted value toward the reference value to produce a pulse signal each time the reference value is reached, and energizing means for receiving the pulse signal directly from the up-down counter, and responsive thereto for energizing the blade drive motor means to drive the wiper blade means.

2. A windshield wiper device in accordance with claim 1, wherein said wiper switch has an intermittent position for producing the first signal.

3. A windshield wiper device in accordance with claim 2, wherein said memory comprises a latch for receiving the counted value in the up-down counter as an input and producing an output which is used as a set input for the up-down counter.

4. A windshield wiper device in accordance with claim 1, wherein said wiper blade means has a nest position, and said energizing means includes a relay switch for closing the energizing means when the pulse signal is produced by said up-down counter, and an auto-stop switch for closing the energizing means when the wiper blade means is out of its nest position.

* * * * *